Aug. 11, 1959  R. S. DOERR  2,898,948
MACHINE FOR MAKING BARBED WIRE
Filed March 15, 1954  4 Sheets-Sheet 1

INVENTOR
Raymond S. Doerr
BY Roy A. Plant
ATTORNEY

Aug. 11, 1959  R. S. DOERR  2,898,948
MACHINE FOR MAKING BARBED WIRE
Filed March 15, 1954  4 Sheets-Sheet 2

INVENTOR
Raymond S. Doerr
BY Roy A. Plant
ATTORNEY

Aug. 11, 1959 R. S. DOERR 2,898,948
MACHINE FOR MAKING BARBED WIRE
Filed March 15, 1954 4 Sheets-Sheet 4

INVENTOR
Raymond S. Doerr
BY Roy A. Plant
ATTORNEY

United States Patent Office 2,898,948
Patented Aug. 11, 1959

2,898,948

MACHINE FOR MAKING BARBED WIRE

Raymond S. Doerr, Battle Creek, Mich., assignor to Dare Products, Incorporated, Battle Creek, Mich., a corporation of Michigan Application March 15, 1954, Serial No. 416,007

17 Claims. (Cl. 140—59)

The present invention relates broadly to the manufacture of wire goods, and in its specific phases to an apparatus for producing barbed wire.

The barbed wire now commonly found on the open market, aside from that of the present invention, is of the twisted double-strand main wire type with barbs, commonly of double form having four points, mounted on same at four to eight-inch spacings. That type of wire is strong, relatively expensive, and particularly well adapted for use in making multi-strand barbed wire fences, or as a top wire above a woven wire fence to keep cattle and horses from eating across the fence and breaking same or causing it to sag.

Several efforts have been made in the past to produce barbed wire fencing with a single main wire instead of a pair of main wires, but the fact that they are not on the open market indicates that none of them proved commercially successful. Those constructions were of rather varied form in that some of the single-strand barbed wire producing machines were arranged to wind barbs with close tight coils and then to slightly flatten the barb and main wire for holding the barb against endwise movement. Other of these machines produced a continuous wave or spiral in the main wire and then wound the barb in the hollows of the waves or spiral, while other machines stamped waves at barb spacing intervals in the main wire and then attempted to wind the barbs in these spaced wave portions, and still others formed loops in the main wire and fitted barbs in those loops. While some of these constructions may have appeared to have been theoretically practical, it turned out that they were too difficult to produce, or too costly, or something else, so that they were not commercially feasible. It was a recognition of the difficulties and shortcomings of the prior art in the single-strand barbed wire field and the need of such a product for use in low cost electric fencing, which led to the conception and commercial development of the barbed wire producing machine of the present invention.

Accordingly among the objects of the present invention is the production of a practical machine for putting barbs on a single-strand main wire.

Another object is to form single wide-spaced open coil barbs on a single main wire which is substantially straight up to the barb installation point, and to fixedly anchor said barb in place after the winding of same is complete.

Another object is to produce single wide-spaced open coil barbs on a single-strand main wire with preliminary anchoring of said barb in place by placing a small kink in the main wire at the barb location at the start of the spinning of the barb on the main wire with one coil of said barb engaging a portion of said kink.

Another object is to produce single wide-spaced open coil barbs on a single-strand main wire at predetermined barb spacings, with each barb preliminarily held in place by placing a small kink in the main strand at the barb location during the formation of the latter to facilitate carrying of the barb by the main wire during its endwise movement, and then swedging said barb on said main strand to sidewise flatten the barb coils and at the same time place a wave in said main strand with the coils of said barb fitting said waved portion of said main strand to thus positively anchor said barb against both rotation and endwise movement relative to the main strand.

A further object is to provide a machine for commercially producing single-strand barbed wire at relatively low cost and with the barbs firmly anchored at predetermined spacings on the main wire.

A further object is to provide a barbed wire machine for producing barbed wire having a single-strand main wire, and wherein the barb spinning head of the machine has a longitudinally extending eccentric opening through which the single-strand main wire passes.

A further object is to provide a machine for producing barbed wire having a single-strand main wire, and wherein such machine has a spinning head with the single-strand main wire passing lengthwise through same, while the barb strand angularly passes through said spinning head substantially tangent to said main wire strand and is spun around said main wire by said spinning head.

A further object is to provide a machine for producing barbed wire having a single-strand main wire, and wherein such machine has a spinning head with the single-strand main wire passing longitudinally through same while said piece of barb stock angularly passes through said spinning head substantially tangent to said single-strand main wire, said spinning head retracting endwise as it spins the barb around the single-strand main wire and then moves back to starting position when the so produced barb is moved toward the barbed wire windup away from the spinning head.

Still further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

Referring more particularly to Figures 1, 2, 3 and 4 of the drawings, it will be noted that the apparatus, for convenience, is mounted on a table 1. That table has a lower platform member 2 on which is conventionally mounted an electric motor 3, which is supplied with operating electricity in well known conventional manner. That motor, through V-belt 4 drives main shaft 5 which is conventionally supported on bearing brackets 6 mounted on the under face of upper platform member 7. Main jack shaft 8, mounted on bearing brackets 9, supported on lower platform 2, is driven from main shaft 5 through sprockets 10 and 11 and chain 12. Upper jack shaft 13 is driven from main jack shaft 8 by means of sprockets 14 and 15, and chain 16, said upper jack shaft being supported from upper platform member 7 by means of bearing brackets 17. Intermediate jack shaft 18, conventionally mounted on bearing brackets 181 is driven from upper jack shaft 13 by means of sprockets 19 and 20, and chain 21.

Figures 1, 17:
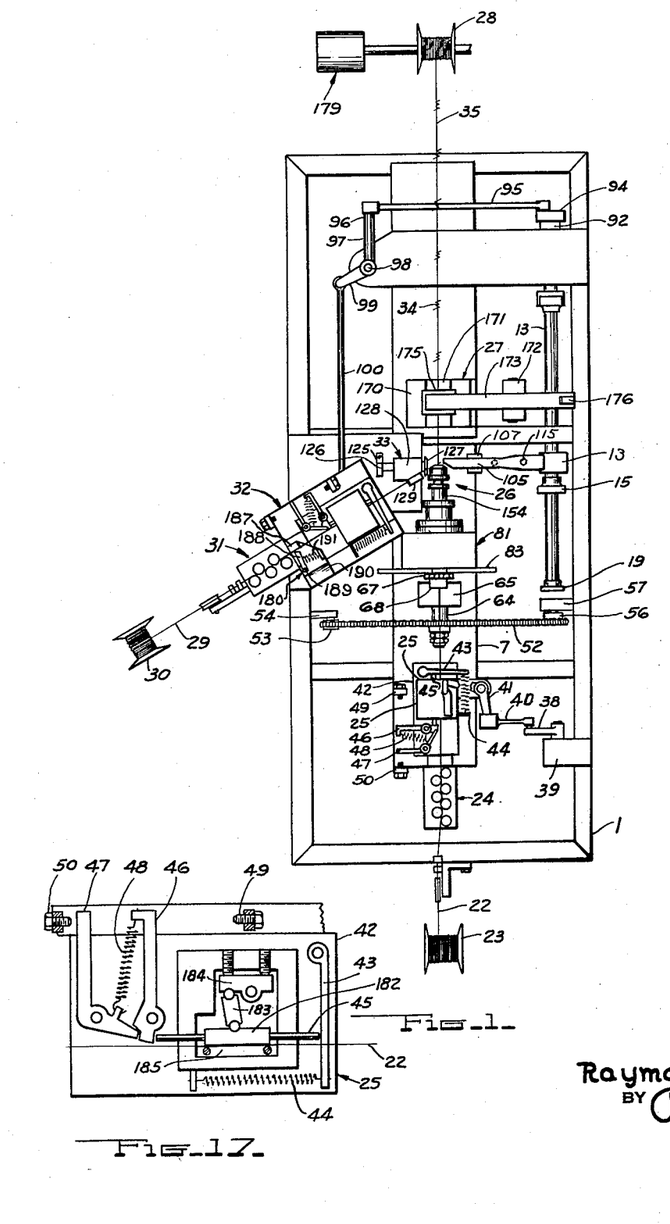
Figure 1 shows a top assembly view diagrammatically illustrating the general combination of the barbed wire producing machine of the present invention, but with some parts and subassemblies omitted for clarity of illustration.
Figure 17 shows an enlarged top view of main wire hitch feed with the cover portion omitted to show the working parts of same.

The main wire 22, Figure 1, is withdrawn from a conventional supply of wire 23, passed through a wire tensioning member, which for convenience will be called a wire motion retarder 24, and a conventional hitch feeder assembly 25 which intermittently pulls the main wire through retarder 24 and forwards same during each cycle of its operation a distance equal to the barb spacing on the finished barbed wire. From the hitch feeder, the main wire 22 passes through barb mounting assembly 26, and the barb swedging assembly 27, to a spool 28, rotated intermittently by any suitable drive member 179, where the finished barbed wire is wound ready for marketing.

The wire 29, from which the barbs are made and which normally is the same as the main wire 22, is delivered from a conventional supply of wire 30 through a wire straightener 31 to a conventional hitch feeder assembly 32, and through a barb cut off mechanism 33 to the barb mounting assembly 26. The hitch feeder assembly 32 feeds the barb stock just the right distance for severing and forming of the barb 34 on the main wire 22 to produce the finished barbed wire 35.

Figure 2:
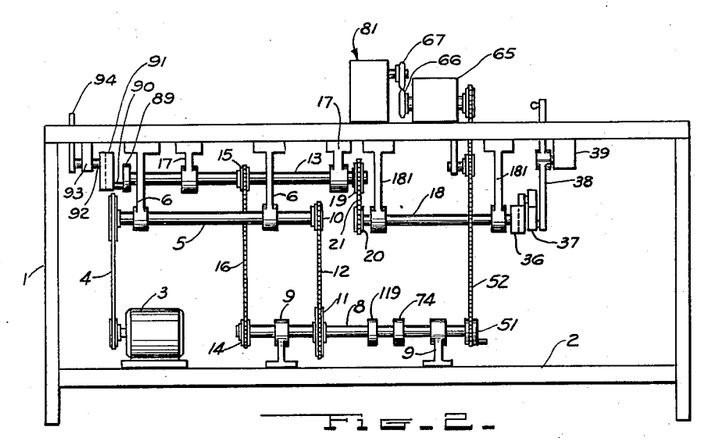
Figures 2 and 3 show side and end views (left and bottom) of the assembly illustrated in Figure 1, and principally illustrating in diagrammatic manner how the motor is connected for driving the various shafts of the assembly and their connection (Figure 2) to the upper portion of the assembly for driving the barb spinning head, the remaining parts of the assembly being omitted for clarity of illustration.
Figure 3:
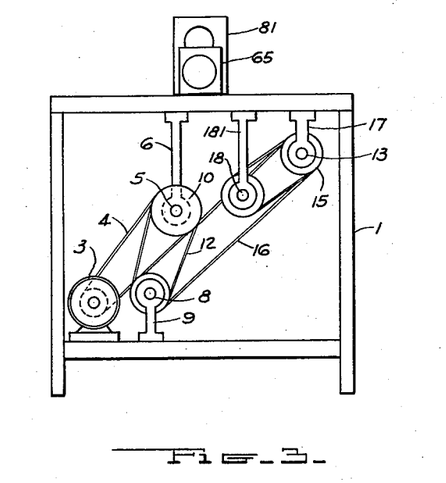
Figure 4:
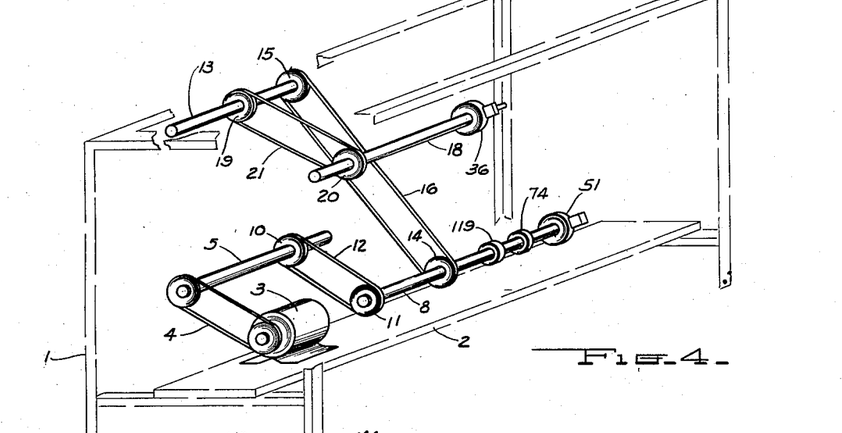
Figure 4 shows a perspective view illustrating the driving connections of the motor to the main shaft and jack shafts of the assembly.

The hitch feeder for the main wire 22 is driven by intermediate jack shaft 18, Figure 2, which carries an adjustable throw member 36 which is connected by a link 37 to a walking beam 38 mounted on bearing 39 and connected through link 40, Figure 1, to a bell crank lever 41, the oscillation of which, through a conventional connection to the hitch feeder 25, moves the latter with its one-way clutch portion 42 back and forth a distance equal to the spacing of the barbs on the barbed wire 35. Any conventional hitch feeder assembly 25 may be used for this purpose. In the construction which has been diagrammatically shown in Figures 1 and 17, the hitch feeder 25 carries a pivotally mounted lever 43 which is held in retracted position by means of tension spring 44 and in contact with extending pin 45 which is joined to and holds the gripper 182 of one-way clutch portion 42 with a tight grip on the main wire 22 in its forward motion. This gripper 182 is pivotally held by link 183 which in turn is pivotally mounted on a pivotally mounted adjustable member 184. Wire 22 during forwarding movement is gripped by gripper 182 up against stop member 185. Trigger members 46 and 47, with tension spring 48 connecting them, are actuated by contact of member 46 with the adjustable stop member 49 at the forward end of the hitch member travel to release the one-way clutch through contact with pin 45 and endwise movement of same with gripper 182, and by means of engagement by member 47 to hold it released until trigger member 47 contacts adjustable stop member 50 to actuate trigger member 47, release trigger member 46, and allow gripper 182 of one-way clutch member 42 through pin 45, lever 43, and tension spring 44 to again grip main wire 22 at the start of the feed movement of the hitch feeder assembly 25, thus completing the cycle of operation.

A convenient procedure relative to placing the barbs 34 on the main wire 22 is to give the piece of wire, from which the barb is to be made, a predetermined number of open spiral turns around the main wire. A suitable mechanism for this purpose will now be described. An adjustable throw member 51, Figure 10, carried by main jack shaft 8 is connected to one end of a chain 52 which passes over an idler 53 carried on a suitable mounting bracket 54 with such chain passing over a sprocket 55 and thence over idler 56 carried on a suitable bracket 57 with the end of said chain connected to the upper end of a tension spring 58 anchored at its lower end to bracket 59 fixedly joined to lower platform member 2. Spocket 55 is conventionally mounted, as by screws 186, Figure 11, on the end of male member 60 of a special form of one-way clutch 61 which has a female member 62 fastened by means of a key 63 to a stub shaft 64 carried by a bearing block 65, Figure 10, with said stub shaft having at its opposite end a spur gear 66, Figure 2, which drives a spur gear 67 mounted on main spindle body member 133 of hollow shaft assembly 68. Fixedly mounted on the same shaft is a single notch cam 69, Figures 10 and 14.

Figure 11:
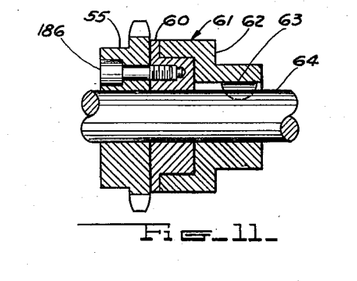
Figure 11 shows a center section of a special form of one-way clutch used in connection with intermittently rotating the barb spinning head.
Figure 12:
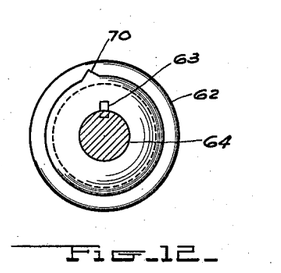
Figure 12 shows the interior of the assembly of Figure 11 but with the male member removed.
Figure 13:
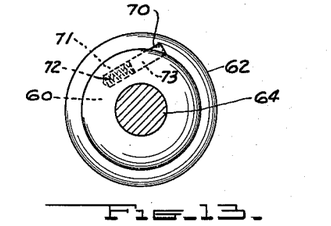
Figure 13 shows a view similar to Figure 12 but illustrating, in phantom, the male member with its dog engaged with the female member and rotating same in counterclockwise direction.

The one-way clutch 61, Figure 11, has its female member 62 provided with a notch 70, Figure 12, while the male member 60, shown in phantom in Figure 13 superimposed on female member 62, is provided with a bore 71 in which is fitted a short compression spring 72 and a dog 73 adapted to have the end of same engage notch 70 in the inner bore of female member 62. Referring to Figure 13, it is thus clear that if female member 62 has a suitable moderate rotational resistance applied to same, rotation of male member 60 in clockwise direction will force dog 73 backward out of notch 70 and compress compression spring 72 so that the male member 60 can rotate relative to female member 62. On the other hand, if under the same conditions male member 60 is turned in counterclockwise direction, the side of notch 70 will place a shearing force on the side of dog 73 without retracting same and accordingly under those conditions the male and female members 60 and 62 will rotate in unison to drive shaft 64.

Figure 10:
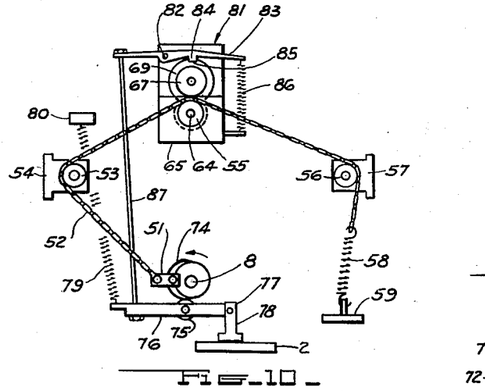
Figure 10 shows the drive mechanism which intermittently rotates the barb spinning head.

Rotation of sprocket 55 in counterclockwise direction as seen in Figure 10, rotates one-way clutch 61 as a unit in the same direction while female member 62 and shaft 64 of one-way clutch 61 stand still during clockwise motion of sprocket 55.

Main jack shaft 8 carries cam 74, Figure 10, in contact with a roller 75 carried by arm 76 pivotally mounted at 77 on bracket support 78 carried by lower platform member 2. The outer end of arm 76 has connected thereto a tension spring 79 with the other end of said spring fastened to a bracket 80 carried on table 1. Mounted on bearing block assembly 81 by means of a pivot pin 82 is a walking beam 83 which has projecting from its under face a stop dog 84 adapted to engage notch 85 in single notch cam 69. A tension spring 86, conventionally supported at its lower end on bearing block assembly 81, or other convenient point, provides pressure for normally urging stop dog 84 in engagement with notch 85 of single notch cam 69. The opposite end of walking beam 83 is connected by means of a pull rod 87 to arm 76 adjacent its end connected to spring 79. When stop dog 84 is in engagement with notch 85, hollow shaft assembly 68, with barb spinning head 88 on the other end of same, will be held with said head in its adjusted position ready to receive the piece of barb stock, which ultimately becomes barb 34, ready for spinning (winding) around main wire 22, as will hereinafter be set forth. As a convenient procedure, the adjustable throw member 51 is adjusted so that during each cycle of its operation it pulls chain 52 to rotate sprocket 55 a sufficient distance to rotate hollow shaft assembly 68 two full revolutions. Cam 74, Figure 10, through arm 76, pull rod 87 and walking beam 83 acts to lift stop dog 84 out of notch 85 at the start of the new cycle of spinning the barb on to the main wire. Stop dog 84, due to cam action of cam 14, is dropped back onto the outer surface of single notch cam 69 after the full completion of its first revolution, where stop dog 84 is ready to drop into notch 85 at the end of the second revolution, and hold the barb spinning head in proper position for receiving the next piece of barb stock.

Referring to Figure 2, upper jack shaft 13 has an arm 89 on its end with said arm carrying a projecting member 90 with its axis parallel to shaft 13 and eccentric thereto, said projecting member sliding back and forth in the slotted face of arm 91 of bell crank 92 supported on a conventional bearing bracket 93. The second arm 94 of bell crank 92 is pivotally connected to a link 95, Figure 1, which is pivotally connected at its other end to one arm 96 of bell crank 97 mounted on pivot 98 with the second arm 99 of said bell crank 97 connected to a link 100 which actuates the hitch feed 32 for the barb stock in the same manner as has been described in connection with hitch feeder 25 for main wire 22, and detailed description of same is therefore being omitted.

Figure 9:
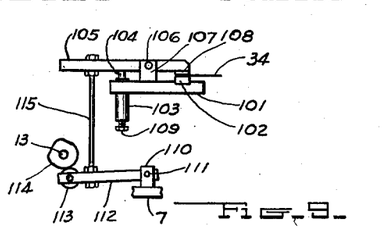
Figure 9 shows the mechanism for holding one end of a barb forming wire during the spinning of the barb on the main wire.

Referring to Figure 9, the mechanism shown there is used for holding the end of the barb 34 during the period of spinning (winding) same around main wire 22. Support member 101 carries an anvil 102 adjacent one end of the upper face of same, and at its other end there is a depending tubular member 103 containing a compression spring (not shown) which exerts outward projecting force on a push rod 104 slidably extending from the upper end of member 103 in contact with the under face of a gripping arm member 105 mounted on a pivot 106 carried by support arms 107 extending upward from the upper face of support member 101. The gripping end portion 108 of gripping arm member 105 is preferably lightly serrated for better holding power on the end of the piece of wire used for forming the barb 34. The corner of the gripping end portion 108 is preferably chamfered away adjacent barb spinning head 88, as is typically shown in Figure 1, to facilitate gripping the end of the wire forming the barb at the desired point adjacent main wire 22 where it issues from barb spinning head 88. A set screw 109, or the like, is used to control the gripping force exerted, through the compression spring (not shown) in tubular member 103, on push rod 104 for holding the wire forming the barb 34 while same is held between the anvil 102 and the gripping end portion 108 of gripping arm member 105. Supported on upper platform member 7 is a bracket 110 on which is mounted, by means of pivot pin 111, an arm 112 on which is a pivotally mounted roller 113 in contact with cam 114 mounted on upper jack shaft 13. Adjustably connecting arm 112 to gripping arm member 105 in operable manner is a link 115. Cam 114 is positioned on upper jack shaft 13 so that gripping end member 108 of gripping arm member 105 will be lifted at the end of the barb spinning (wrapping) operation in order that the barbed wire can be moved forward while the end of the next new barb to be installed is moving under gripping end portion 108. Further rotation of cam 114 then allows gripping end portion 108 to grip the end of the new barb projected thereunder before the spinning operation is started, the gripping, of course, to be taken care of by means of the pressure exerted by the compression spring (not shown) in tubular member 103 and which forces push rod 104 against the under face of gripping arm 105.

Figure 7:
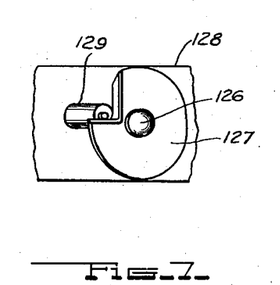
Figure 7 shows a fragmentary perspective view of the barb stock cutter.
Figures 14, 15, 16:
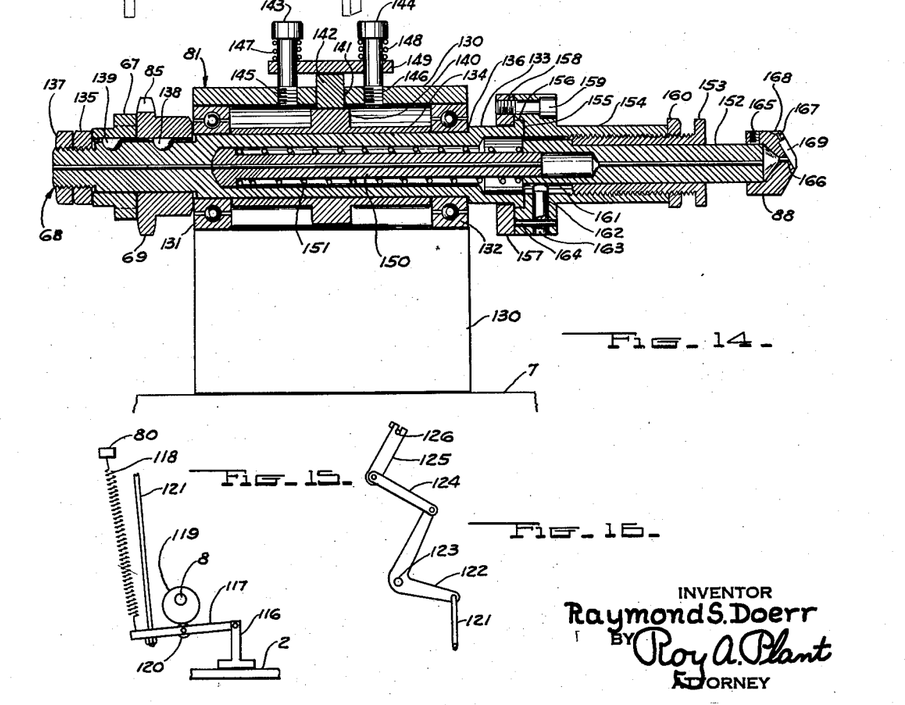
Figure 14 shows an enlarged longitudinal center section view through the barb spinning assembly.
Figures 15 and 16 show the lower and upper portions, respectively, of the barb cutter operating linkage.

In connection with the barb cutoff mechanism, there is a bracket member 116, Figure 15, mounted on lower platform member 2 with arm member 117 pivotally mounted at one end on said bracket member and with its other end joined to a tension spring 118 with the upper end of said spring fastened to bracket 80. A cam 119 mounted on main jack shaft 8 is in contact with roller 120 mounted on arm member 117. Connected to arm member 117 adjacent the connection to spring 118 is an adjustable pull rod 121. The upper end of pull rod 121, Figure 16, is pivotally connected to one arm of bell crank 122 which is mounted on a pivot pin 123. The second arm of said bell crank 122 is pivotally connected to a link 124 which in turn is pivotally connected to operating arm 125, anchored to the end of shaft 126, Figure 1, the other end of which carries a barb cutter knife 127, Figure 7. Shaft 126 is supported on bearing block 128 which in turn supports guide sleeve 129 for the straightened wire from which the barb is formed. This barb cutter is so timed in its sequence of operations that the moment the barb stock has been fed and gripped between anvil 102 and the gripping end portion 108 of gripping arm member 105, the cutter knife 127 is rotated clockwise, as seen in Figure 7, to sever the barb member and then returned to starting position ready for the next cycle of operation.

In connection with the apparatus for spinning (winding) the barb 34 on main wire 22, the barb spinning mechanism 26 includes a body member 130, Figure 14, mounted on upper platform 7, said body member 130 being provided at opposite ends with ball bearings 131 and 132 for supporting the main spindle body member 133. Tightly fitting the outer circumference of a major portion of the length of the main spindle body member 133 is a sleeve 134. By tightening nut 135 mounted on the end of main spindle body member 133, the ends of gear 67, single notch cam 69, ball bearings 131 and 132, and sleeve 134, are bound tightly together due to bearing 132 coming up against shoulder 136 of the main spindle body member 133. Lock nut 137 is then tightened against nut 135 to lock the whole assembly together. Single notch cam 69 is keyed to main spindle body member 133 by means of a key 138. Gear 67 is likewise held in fixed position on the main spindle body member by means of key 139. Sleeve 134 is preferably provided with a central rib 140 and body member 130 is provided with a drilled opening 141 in which is fitted a graphite plug 142 adapted to contact the outer face of rib 140. Adjustable studs 143 and 144 threadedly fit suitable openings 145 and 146 in body member 130. Compression springs 147 and 148 engaging the top of a cross bar 149 and the under face of the heads of adjustable studs 143 and 144 are used to apply endwise pressure on graphite plug 142 to produce frictional resistance to rotation of the main spindle body member 133 while permitting same to be readily rotated without overrun at the end of each operating cycle of same.

Mounted inside of main spindle body member 133 is a sleeve member 150 which is recessed on its outer face from near one end all the way to its other end which is adjacent to barb spinning head 88. Concentric with that sleeve member 150 in said recess is a long compression spring 151, one end of which bears against the enlarged end of sleeve member 150 and at its other end against the inner end of the barb spinning head sleeve 152. That sleeve is enlarged at its inner end and bored to telescopically receive the end of sleeve member 150. Fitting around the barb spinning head sleeve 152 is an adjusting sleeve 153 which is externally threaded and fits the internal threads of a sleeve member 154 which is enlarged and provided with a counter bore 155 at its other end to receive the outwardly flanged end 156 of main spindle body member 133. Counterbore 155 is slightly shallower than the thickness of flange 156 so that a ring member 157 with suitably threaded openings 158 therein may be engaged by studs 159 to clamp flange 156 tightly to sleeve member 154 so that they will rotate in unison. A check nut 160 is used to lock adjusting sleeve 153 in place on sleeve member 154.

The barb spinning head sleeve 152 is provided with a keyway 161 and sleeve member 154 is provided with a passageway 162 for a pin 163 adapted to have its end fit into keyway 161 to make barb spinning head sleeve 152 rotate in unison with sleeve member 154. This pin 163, after same has been fitted in place, may be anchored with a cross pin 164.

It is thus to be seen that by loosening check nut 160, adjusting sleeve 153 may be threadedly moved in or out to adjust the position of barb spinning head 88 in longitudinal direction, while by loosening studs 159, sleeve member 154 may be rotated relative to main spindle body member 133 to adjust the rotary position of the barb spinning head. These two adjustments make possible the adjusting of the barb spinning head 88 to the proper location to receive the barb stock when it is fed through the spinning head to the barb spinning (winding) position.

Figure 5:
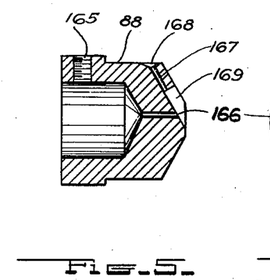
Figure 5 shows a longitudinal section view of the barb spinning head as seen at line 5—5 of Figure 6, looking in the direction of the arrows.
Figure 6:
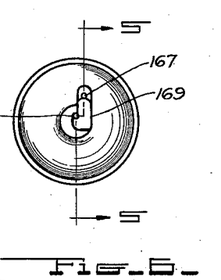
Figure 6 shows an end view of the barb spinning head.

The barb mounting assembly which includes spinning head 88, Figures 5 and 14, is of a very special construction in that said spinning head is counterbored to fit on the end of barb spinning head sleeve 152 and anchored thereon by means of a set screw 165. There is a passageway through main spindle body member 133, sleeve member 150 and barb spinning head sleeve 152 all in alinement. The barb spinning head 88, however, has its passageway 166 therethrough off-center and provided with a tapered inlet to facilitate threading the main wire 22 therethrough. This spinning head is also provided with an angular passageway 167, Figures 5, 6, and 14, with a tapered outer inlet 168 thereto and a cut away portion 169 for the passage of the barbed wire stock to the point of gripping between anvil 102, Figure 9, and gripping end portion 108 of gripping arm member 105.

Figure 8:
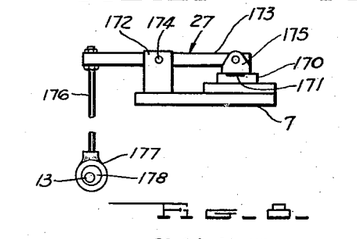
Figure 8 shows a fragmentary assembly view of the barb swedging mechanism.

In order to firmly anchor barbs 34 on main wire 22, there is provided a barb clenching assembly 27, Figures 1 and 8. This assembly utilizes an anvil 170 supported on upper platform member 7. That anvil assembly has a recess 171 in its upper face with such recess having a substantially flat bottom and being of a depth approximately equal to the thickness of main wire 22 plus one thickness of the barb stock. That depth is thus just sufficient to receive the main wire 22 and barb so that they will extend slightly above such recess. This anvil 170 is also spaced from the barb spinning head 88 so that a barb will be on the anvil when another barb is being spun onto the main wire 22. Mounted on upper platform member 7 is a pair of bracket arms 172 which carry walking beam 173 on a pivot 174. This walking beam has a pivotally mounted hammer head 175 located over anvil 170 and preferably extending across and centered on recess 171 thereof. The other end of walking beam 173 is adjustably connected to push rod 176 which carries a member 177 on its lower end adapted to encircle eccentric 178 mounted on upper jack shaft 13. The exact length of push rod 176 is adjusted so that hammer head 175 at the end of the final anchoring of the barb on main wire 22 will rest on the top of anvil 170 at the opposite sides of recess 171. Thus with a barb mounted on main wire 22 and on the anvil, the downward blow struck by hammer head 175 will press the spirally wound barb against main wire 22 and tighten the barb in place by putting a wave in the main wire with the side portions of the barb resting in the hollow of each wave while the barb body takes on an oval shape in crosswise section. This firmly locks the barb against endwise movement as well as rotation on the main wire under conditions of use.

The operation of the machine is as follows: With electric motor 3 in operation, hitch feeder 25 will feed main wire 22 through each cycle of the hitch feeder operation a distance equal to the spacing between barbs 34 on the finished barbed wire 35. That wire is wound up on a spool 28 which has a drive member 179 which applies winding force to said spool so as to wind up the finished barbed wire as fast as it becomes available for winding. The barb spinning head 88 is intermittently rotated a desired uniform amount, for instance two revolution for each barb, by means of the apparatus shown in Figure 10. The barb stock hitch feeder 32 is set at an angle to feed the barb stock at an angle from the line of feed of main wire 22 corresponding to the angle of angular passageway 167 in barb spinning head 88, as is clearly indicated in Figures 1 and 5 of the drawings. When the spinning head 88 comes to rest, the barb stock is fed through angular passageway 167 thereof with the point of the barb stock passing between anvil 102, Figure 9, and gripping end portion 108 of gripping arm member 105. As soon as the barb stock is gripped, barb cutting knife 127, Figure 7, severs the barb stock and then the apparatus is ready for spinning (winding) of the barb onto main wire 22. At this point the apparatus shown in Figure 10 goes into operation and spins spinning head 88 through two complete revolutions. Since spinning head 88 is supported in its outer or barb stock receiving position by means of a long compression spring 151, Figure 14, that spring allows the spinning head to move backwards with its supporting sleeve 152, which telescopes into its support assembly, during the spinning operation so that the barb is wound in open spiral pattern on main wire 22 and slides through angular passageway 167 of the spinning head 88 during such spinning action and ends up with its end in the cut away portion 169, Figures 5 and 6, of the spinning head 88. At this point hitch feeder 25 for the main wire 22 grips same to feed it forward to get the machine ready for the next barb forming cycle, and drive member 179 winds up the released portion of the finished barbed wire on spool 28. This newly finished barb has then been moved so that it is in place on the anvil 170, Figures 1 and 8, of the barb clenching assembly 27, where it remains during the spinning of the next barb, and during which time the barb on the anvil is flattened.

A matter of importance to this barb forming operation is the fact that the passageway 166, Figure 5, for main wire 22 passing through spinning head 88, is off-center. This accomplishes two things. First, it facilitates winding the barb around the main wire and, while doing so, is so close to the point of gripping end portion 108, Figure 9, of the gripping arm member 105, Figures 1 and 9, that, in the second place, it bumps the main wire and barb against the point of that jaw and places a slight kink in the main wire which acts to preliminarily anchor the barb in place so that it carries to the barb clenching assembly without shifting and, in fact, provides an extra holding factor in connection with the barb even after same has passed the clenching operation.

In order to prevent the barb stock 29 from backing up slightly at the end of the barb stock feeding cycle, before the barb piece has been gripped and cut off, there is provided a return movement stop mechanism 180, Figure 1. This mechanism has a stop member 187 against which barb stock wire is normally gripped by a dog 188 mounted on pivot pin 189 carried by stationary member 190 of the hitch feed 32. The dog 188 is held by mild compression spring 191 so its point holds wire 29 up against stop member 187 at all times, and while it allows such wire to freely move in barb stock feeding direction, reverse movement is prevented due to any counter-clockwise movement of the dog binding the wire up against stop member 187.

Other modes of applying the principle of my invention may be employed instead of the one explained, change being made as regards the barbed wire producing apparatus and the combinations herein disclosed, provided the means stated by any of the following claims or the equivalent of such stated means be employed.

I therefore particularly point out and distinctly claim as my invention:

1. In a machine for producing single strand barbed wire and having an intermittent feed means for a single strand main wire together with a second intermittent feed means for a separate single strand wire for barbs, means controlling and timing the operation of said two intermittent feed means so that said barb stock is fed and severed at the proper time for winding on said main wire, means for guiding said barb stock in endwise direction into barb forming position, and means for cutting said last named wire into a barb length piece at the end of each barb stock feeding cycle and before the barb winding cycle, the combination which comprises a frame having a fixed location bearing assembly carrying an extending endwise movable sleeve which is retractable and which has mounted on the extending end of same a spinning head for winding said barb length piece of wire around the main wire and then releasing same to form a barb thereon, resilient means for projecting said sleeve and spinning head into starting spinning position, said spinning head and sleeve having a longitudinal passageway therethrough for said main wire and an acute angle barb stock receiving tubular passageway extending from one side of said spinning head and coming out of the end of same near and substantially tangent to the outlet end of said longitudinal passageway through said spinning head to facilitate winding said severed piece of barb stock in an open spiral around said main wire, a fixed location jaw including gripping means mounted on said frame for receiving and holding the initially projected end of said severed barb length piece of wire stationary during the winding of the central portion of same by said spinning head around said main wire, and intermittent jaw operating means for releasing the grip of said fixed location jaw portion of said gripping means at the end of said barb winding operation and then moving same to grip the end of the next barb member supplied for winding, such gripping taking place prior to the start of each barb winding cycle, wherein a telescopable means on said fixed location bearing assembly carries a portion of which said retractable spinning head and sleeve assembly is rotatably mounted for winding the barb on the main wire, and wherein there is a compression spring normally holding the spinning head carrying portion of said telescopable means in extended position and which permits said spinning head to retract during the open spiral winding of the barb on the main wire and then returns it to extended position when the main wire and barb moves forward from the winding position.

2. In a machine for producing single strand barbed wire and having an intermittent feed means for a single strand main wire together with a second intermittent feed means for a separate single strand wire for barbs, means controlling and timing the operation of said two intermittent feed means so that said barb stock is fed and severed at the proper time for winding on said main wire, means for guiding said barb stock in endwise direction into barb forming position, and means for cutting said last named wire into a barb length piece at the end of each barb stock feeding cycle and before the barb winding cycle, the combination which comprises a frame having a fixed location bearing assembly carrying an extending endwise movable sleeve which is retractable and which has mounted on the extending end of same a spinning head for winding said barb length piece of wire around the main wire and then releasing same to form a barb thereon, resilient means for projecting said sleeve and spinning head into starting spinning position, said spinning head and sleeve having a longitudinal passageway therethrough for said main wire and an acute angle barb stock receiving tubular passageway extending from one side of said spinning head and coming out of the end of same near and substantially tangent to the outlet end of said longitudinal passageway through said spinning head to facilitate winding said severed piece of barb stock in an open spiral around said main wire, a fixed location jaw including gripping means mounted on said frame for receiving and holding the initially projected end of said severed barb length piece of wire stationary during the winding of the central portion of same by said spinning head around said main wire, and intermittent jaw operating means for releasing the grip of said fixed location jaw portion of said gripping means at the end of said barb winding operation and then moving same to grip the end of the next barb member supplied for winding, such gripping taking place prior to the start of each barb winding cycle, wherein there is means for positioning the spinning head both endwise and in rotary direction when in starting position to aline the acute angle barb stock receiving passageway of same with the means for guiding the barb stock, and means for anchoring said spinning head in the noted position.

3. In a machine for producing single strand barbed wire and having an intermittent feed means for a single strand main wire together with a second intermittent feed means for a separate single strand wire for barbs, means controlling and timing the operation of said two intermittent feed means so that said barb stock is fed and severed at the proper time for winding on said main wire, means for guiding said barb stock in endwise direction into barb forming position, and means for cutting said last named wire into a barb length piece at the end of each barb stock feeding cycle and before the barb winding cycle, the combination which comprises a frame having a fixed location bearing assembly carrying an extending endwise movable sleeve which is retractable and which has mounted on the extending end of same a spinning head for winding said barb length piece of wire around the main wire and then releasing same to form a barb thereon, resilient means for projecting said sleeve and spinning head into starting spinning position, said spinning head and sleeve having a longitudinal passageway therethrough for said main wire and an acute angle barb stock receiving tubular passageway extending from one side of said spinning head and coming out of the end of same near and substantially tangent to the outlet end of said longitudinal passageway through said spinning head to facilitate winding said severed piece of barb stock in an open spiral around said main wire, a fixed location jaw including gripping means mounted on said frame for receiving and holding the initially projected end of said severed barb length piece of wire stationary during the winding of the central portion of same by said spinning head around said main wire, and intermittent jaw operating means for releasing the grip of said fixed location jaw portion of said gripping means at the end of said barb winding operation and then moving same to grip the end of the next barb member supplied for winding, such gripping taking place prior to the start of each barb winding cycle, wherein there is means for stopping said spinning head at the end of each spinning operation of same so that when same is in extended position its acute angle barb stock receiving passageway will be in the same position, means for positioning said spinning head both in endwise and rotary directions, so that when same is in starting position, the acute angle barb stock receiving passageway of same will aline with the means for guiding the barb stock, and means for anchoring said spinning head in the noted position.

4. In a machine for producing single strand barbed wire and having an intermittent feed means for a single strand main wire together with a second intermittent feed means for a separate single strand wire for barbs, means controlling and timing the operation of said two intermittent feed means so that said barb stock is fed and severed at the proper time for winding on said main wire, means for guiding said barb stock in endwise direction into barb forming position, and means for cutting said last named wire into a barb length piece at the end of each barb stock feeding cycle and before the barb winding cycle, the combination which comprises a frame having a fixed location bearing assembly carrying an extending endwise movable sleeve which is retractable and which has mounted on the extending end of same a spinning head for winding said barb length piece of wire around the main wire and then releasing same to form a barb thereon, resilient means for projecting said sleeve and spinning head into starting spinning position, said spinning head and sleeve having a longitudinal passageway therethrough for said main wire and an acute angle barb stock receiving tubular passageway extending from one side of said spinning head and coming out of the end of same near and substantially tangent to the outlet end of said longitudinal passageway through said spinning head to facilitate winding said severed piece of barb stock in an open spiral around said main wire, a fixed location jaw including gripping means mounted on said frame for receiving and holding the initially projected end of said severed barb length piece of wire stationary during the winding of the central portion of same by said spinning head around said main wire, and intermittent jaw operating means for releasing the grip of said fixed location jaw portion of said gripping means at the end of said barb winding operation and then moving same to grip the end of the next barb member supplied for winding, such gripping taking place prior to the start of each barb winding cycle, wherein there is a single notch cam and means connecting same to said retractable spinning head and sleeve assembly for rotation in unison therewith, and a stop mechanism having a stop dog which engages said notch in said single notch cam and holds said retractable spinning head at the end of each barb spinning operation in extended position ready to receive the next piece of barb stock to be wound on the main wire for forming a barb thereon.

5. In a machine for producing single strand barbed wire and having an intermittent feed means for a single strand main wire together with a second intermittent feed means for a separate single strand wire for barbs, means controlling and timing the operation of said two intermittent feed means so that said barb stock is fed and severed at the proper time for winding on said main wire, means for guiding said barb stock in endwise direction into barb forming position, and means for cutting said last named wire into a barb length piece at the end of each barb stock feeding cycle and before the barb winding cycle, the combination which comprises a frame having a fixed location bearing assembly carrying an extending endwise movable sleeve which is retractable and which has mounted on the extending end of same a spinning head for winding said barb length piece of wire around the main wire and then releasing same to form a barb thereon, resilient means for projecting said sleeve and spinning head into starting spinning position, said spinning head and sleeve having a longitudinal passageway therethrough for said main wire and an acute angle barb stock receiving tubular passageway extending from one side of said spinning head and coming out of the end of same near and substantially tangent to the outlet end of said longitudinal passageway through said spinning head to facilitate winding said severed piece of barb stock in an open spiral around said main wire, an intermittent drive means carried by said frame and adapted to rotate said sleeve with its spinning head, means for stopping said sleeve and its spinning head at a fixed positive starting point for each cycle of its operation with said barb receiving passageway of said spinning head in barb stock receiving position, a fixed location jaw including gripping means mounted on said frame for receiving and holding the initially projected end of said severed barb length piece of wire stationary during the winding of the central portion of same by said spinning head around said main wire, and intermittent jaw operating means for releasing the grip of said fixed location jaw portion of said gripping means at the end of said barb winding operation and then moving same to grip the end of the next barb member supplied for winding, such gripping taking place prior to the start of each barb winding cycle, wherein there is a barb swedging assembly to which the barb mounted on said main wire moves from the retractable spinning head, said swedging assembly having an anvil which has a recessed face for receiving the main wire mounted barb to be swedged, said recess being of a depth substantially equal to the thickness of the main wire plus the thickness of the barb stock, a flat face hammer adapted to swedge said barb and come to rest on said anvil at opposite sides of said recess so that every barb is uniformly swedged, and means for intermittently actuating said hammer to swedge and release each main wire mounted barb ready for endwise movement of the barbed wire and the swedging of the next barb to be delivered onto said anvil.

6. An intermittent operation assembly for spirally winding a severed short piece of wire or the like around another wire or the like, which comprises a spinning means for said short piece of wire or the like, means for intermittently rotating said spinning means a predetermined amount from a predetermined starting point, and means for intermittently feeding said other wire or the like and means for holding same substantially stationary during the spiral winding of said severed short piece of wire or the like thereon, said spinning means having a stationary main spindle body member, a retractable spinning head, a sleeve on which said retractable spinning head is mounted, said sleeve being coaxial with said main spindle body member, means for mounting said sleeve on said main spindle body member for endwise movement relative thereto, means for normally holding said sleeve resiliently in extended position on said main spindle body member, said main spindle body member, sleeve, and retractable spinning head having a longitudinal passageway therethrough for said wire or the like on which said severed short piece of wire is to be wound, and said retractable spinning head having a cross passageway for said severed short piece of wire or the like, said cross passageway entering angularly at one side of said spinning head and coming out at the outlet end of the longitudinal passageway therethrough and substantially tangent thereto, the outlet end of said cross passageway being of open channel form as long as the projecting length of a barb end to freely release same at the end of the barb winding, said resilient mounting of said sleeve permitting said spinning head to move endwise in manner facilitating the winding of said severed short piece of wire or the like in open spiral pattern around said other piece of wire or the like.

7. An intermittent operation assembly as set forth in claim 6, wherein said means for normally holding said spindle resiliently in extended position on said main body member consists of a compression spring.

8. An intermittent operation assembly as set forth in claim 6, wherein there is a hollow sleeve member inside of said main spindle body member and telescopically fitting into one end of said sleeve which carries said retractable spinning head on the other end thereof, said sleeve member within said main spindle body member being of reduced outside diameter from its telescoping end almost to the other end thereof, and a compression spring in such reduced diameter portion of said sleeve member for resiliently holding said spinning head carrying sleeve in extended position on said main spindle body member.

9. An intermittent operation assembly as set forth in claim 6, wherein there is a gear means mounted on said main spindle body member for rotating same, and wherein there is means for applying in controlled variable amount resistance to free rotation of said main spindle body member.

10. A machine for producing a single strand barbed wire wherein the barbs are of open spiral pattern and of substantially oval form in cross section and wherein the main wire has sidewise bends corresponding with the number of times said barb turns pass on opposite sides of same, which comprises an intermittent feed means for a single strand main wire, a second intermittent feed means for a single strand wire for barbs, means for straightening said wire from which said barbs are formed, means for guiding said straightened barb stock in endwise direction into barb forming position, means for cutting said wire into a barb length piece at the end of the barb stock feeding cycle and before the barb winding cycle, a spinning head for winding said severed barb length piece of wire around the main wire to form a barb thereon, said spinning head having a slightly eccentric longitudinal passageway therethrough for said main wire and an acute angle barb stock passageway extending from one side of said spinning head and coming out of the outlet end of said spinning head near and substantially tangent to said eccentric longitudinal passageway to facilitate winding said piece of barb stock in an open spiral around said main wire, rotatable means for carrying said spinning head, said rotatable means having a longitudinal passageway therethrough leading to said eccentric passageway through said spinning head, jaw including means for holding one end of said severed barb length piece of wire during the winding of same around said main wire, means for actuating said jaw including means for releasing the grip of said jaw portion thereof at the end of said barb winding operation and then moving same to grip the end of the next barb member supplied for winding, such gripping taking place prior to the start of the barb winding cycle, said eccentric passageway spinning head and said jaw means being so spaced relative to each other that when said spinning head rotates to wind the barb around said main wire, the latter is forcibly bumped up against said jaw including means to kink same and temporarily anchor said barb against endwise slippage on said main wire, and means for swedging said open spiral barb to bend same into a substantially oval cross section and simultaneously bend said main wire in opposite directions at each point where a turn of said barb crosses said main wire so as to firmly anchor said barb against endwise slippage.

11. A single strand barbed wire producing machine as set forth in claim 10, wherein there is a motion retarder means through which said intermittent feed means for the main wire pulls the latter, and wherein there is a power driven windup for the intermittently delivered finished barbed wire.

12. A single strand barbed wire producing machine as set forth in claim 10, wherein there is a telescopable means on which said spinning head is mounted for winding the barb on the main wire, and wherein there is a compression spring normally holding the spinning head carrying portion of said telescopable means in extended position and which permits said spinning head to retract during the spiral winding of the barb on the main wire and then returns it to extended position when the main wire and barb moves forward from the winding position.

13. A single strand barbed wire producing machine as set forth in claim 10, wherein there is means for positioning the spinning head both endwise and in rotary direction when in starting position to aline the acute angle barb stock receiving passageway of same with the means for guiding the barb stock, and means for anchoring said spinning head in the noted position.

14. A single strand barbed wire producing machine as set forth in claim 10, wherein there is means for stopping said spinning head at the end of each spinning operation of same so that when same is in extended position its acute angle barb stock receiving passageway will be in the same position, means for positioning said spinning head both in endwise and rotary directions, so that when same is in starting position, the acute angle barb stock receiving passageway of same will aline with the means for guiding the barb stock, and means for anchoring said spinning head in the noted position.

15. A single strand barbed wire producing machine as set forth in claim 10, wherein there is a single notch cam and means connecting same to said spinning head for rotation in unison therewith, and a stop mechanism having a stop dog which engages said notch in said single notch cam and holds said spinning head at the end of each barb spinning operation in position to receive the next piece of barb stock to be wound on the main wire for forming a barb thereon.

16. A single strand barbed wire producing machine as set forth in claim 10, wherein there is a barb swedging assembly to which the barb moves from the spinning head, said swedging assembly having an anvil which has a recessed face for receiving the barb to be swedged, said recess being of a depth substantially equal to the thickness of the main wire plus the thickness of the barb stock, a flat face hammer adapted to swedge said barb and come to rest on said anvil at opposite sides of said recess so that every barb is uniformly swedged, and means for intermittently actuating said hammer to swedge and release each barb ready for endwise movement of the barbed wire and the swedging of the next barb to be delivered onto said anvil.

17. A single strand barbed wire producing machine as set forth in claim 10, wherein there is an intermittent drive means for said spinning head, said drive means being of reciprocating type with a one-way clutch having a fixed positive drive starting point for each cycle of its operation.

References Cited in the file of this patent

UNITED STATES PATENTS

| | | |
|---|---|---|
| 325,733 | Connell | Sept. 8, 1885 |
| 350,413 | Crecelius et al. | Oct. 5, 1886 |
| 563,367 | Frick | July 7, 1896 |
| 832,512 | Swanbum | Oct. 2, 1906 |
| 972,657 | Smith | Oct. 11, 1910 |
| 1,821,730 | Sommer | Sept. 1, 1931 |
| 2,252,490 | Borkey | Aug. 12, 1941 |
| 2,330,611 | Nelson | Sept. 28, 1943 |
| 2,673,578 | Getz | Mar. 30, 1954 |
| 2,681,084 | Sommerville | June 15, 1954 |
| 2,712,835 | Sampactos | July 12, 1955 |